United States Patent
Manor et al.

(10) Patent No.: US 8,078,768 B2
(45) Date of Patent: Dec. 13, 2011

(54) UNIVERSAL SERIAL BUS (USB) REMOTE WAKEUP

(75) Inventors: Liron Manor, Haifa (IL); Sergio Kolor, Haifa (IL); Yoram Rimoni, Haifa (IL); Igor Malamant, Haifa (IL); Dedy Lansky, Zichron Yaacov (IL)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 12/196,209

(22) Filed: Aug. 21, 2008

(65) Prior Publication Data

US 2010/0049881 A1 Feb. 25, 2010

(51) Int. Cl.
*G06F 3/00* (2006.01)
(52) U.S. Cl. .................. 710/18; 710/14; 710/15
(58) Field of Classification Search .............. 710/14, 710/15, 18
See application file for complete search history.

(56) References Cited

U.S. PATENT DOCUMENTS

| | | | | |
|---|---|---|---|---|
| 5,799,196 A | * | 8/1998 | Flannery | 713/320 |
| 5,874,914 A | | 2/1999 | Krasner | |
| 6,272,644 B1 | * | 8/2001 | Urade et al. | 713/320 |
| 6,567,921 B1 | | 5/2003 | Guziak | |
| 6,708,278 B2 | | 3/2004 | Howard et al. | |
| 2003/0014676 A1 | | 1/2003 | Wang et al. | |
| 2005/0114719 A1 | * | 5/2005 | Stedman et al. | 713/310 |
| 2007/0005824 A1 | * | 1/2007 | Howard | 710/18 |

OTHER PUBLICATIONS

International Search Report and Written Opinion—PCT/US2009/054682—ISA/EPO, Nov. 23, 2009.

* cited by examiner

*Primary Examiner* — Alford Kindred
*Assistant Examiner* — David E Martinez
(74) *Attorney, Agent, or Firm* — Jonathan T. Velasco

(57) ABSTRACT

A universal serial bus (USB) device communicates with a USB host over a USB to remotely wake up the USB host over the USB when the USB host is in a low power (e.g. deep sleep) mode. The USB device performs an activity to wake up the USB host. The USB host performs a remote wake up process in response to detecting the activity by the USB device. The USB host performs a resume process in response to performing the remote wake up process by the USB host. The USB device wakes up in response to the USB host performing the resume process.

22 Claims, 4 Drawing Sheets

100
Universal Serial Bus (USB) System

300
USB Physical Bus Topology

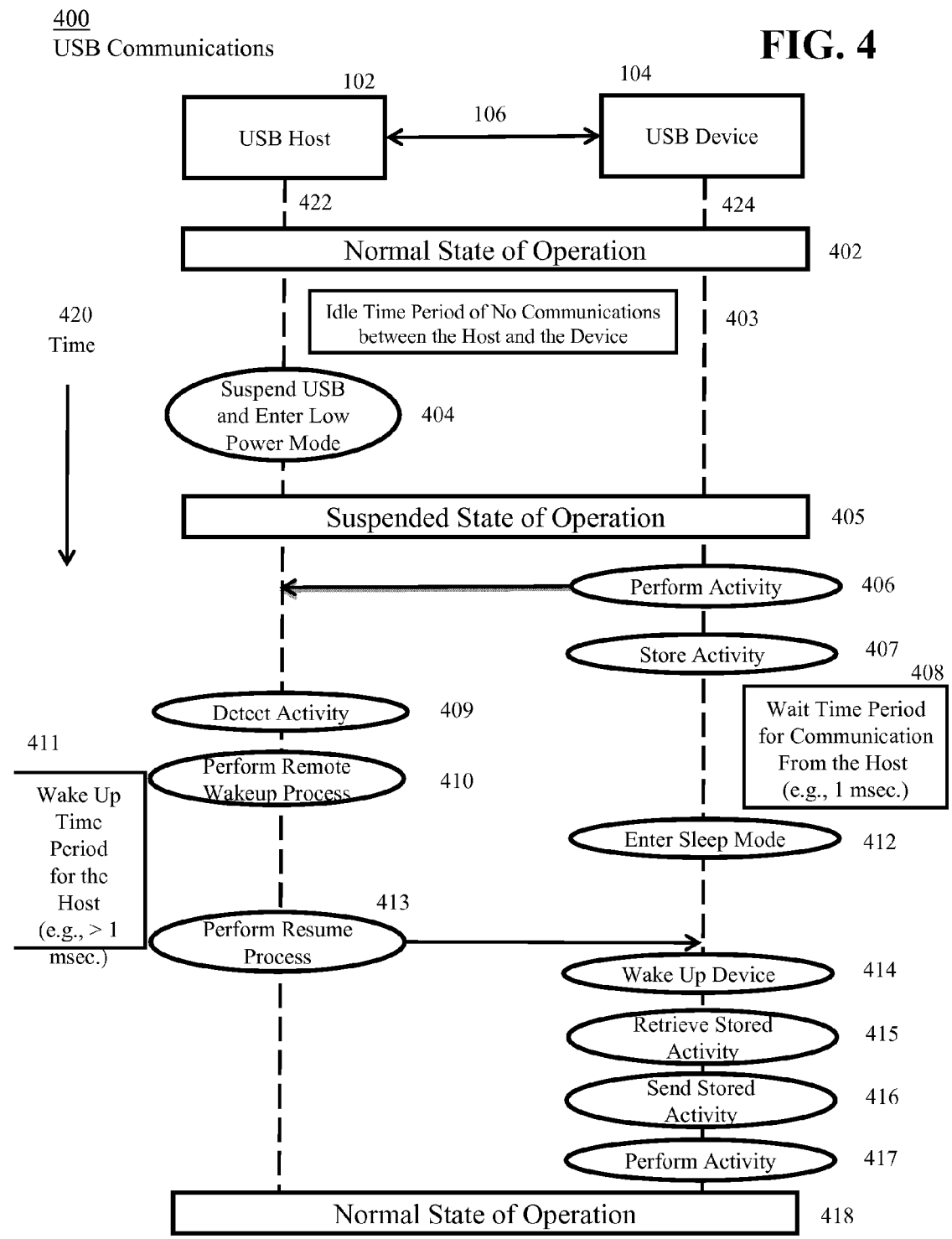

UNIVERSAL SERIAL BUS (USB) REMOTE WAKEUP

FIELD OF THE INVENTION

The present invention generally relates to communications between a Universal Serial Bus (USB) host and a USB device over a USB. More particularly the present invention relates to a USB device remotely waking up a USB host over a USB.

BACKGROUND OF THE INVENTION

Universal Serial Bus (USB) is a serial bus industry standard to interface electronic devices. USB permits many peripheral devices (e.g., secondary hardware devices such as a mouse, keyboard, or modem) to be connected to a host, such as a computer, using a single standardized interface socket.

A single USB port can be used to connect up to 127 peripheral devices. USB supports various features such as Plug-And-Play, hot swapping, providing power to low-consumption devices without the need for an external power supply, allowing many devices to be used without requiring manufacturer specific, individual device drivers to be installed, USB hubs that increase the number of USB ports, USB On-The-Go, and wireless USB.

USB On-The-Go allows a single port on a unit to react as either a host or a peripheral device. Typically, this is selected by checking which end of the USB cable is plugged into the socket on the unit. The two units may even "swap" ends under program control, even after the cable is hooked up and the units are talking. USB On-The-Go is designed for products like personal digital assistants (PDA's) where the USB link might sometimes connect to a computer's host port as a device, and other times connect as a host itself to another peripheral device, such as a mouse and keyboard.

Wireless USB is an application designed to extend the usability of USB, which permits backwards compatibility with USB 1.1 and USB 2.0 on the protocol level. Wireless USB utilizes ultra wideband wireless technology for data transmissions rates up to 480 Mbps. Wireless USB is well suited for wireless connection of certain portable electronic devices allowing transfer of data to occur, without the use of a cable.

After an idle time period of no communications between a USB host and a USB device, the USB host suspends the USB and enters a low power or deep sleep mode to minimize current drain and conserve power. A USB device, which is connected to a USB host that entered a low power mode and would like to again communicate with the USB host, first needs to wake up the USB host. Waking up the USB host is performed by the USB device initiating a remote wakeup process on the USB.

The USB host takes a time period to wake up before providing a communication to the USB device in response to performing the remote wake up process. The wake up time period for some USB host may be greater than one millisecond (i.e. 1 msec.) and for mobile side modems (MSMs) for example may be in the range of seven (7) milliseconds (i.e. 7 msec.). When the USB device has a shorter wait time than the wake up time of the USB host may otherwise be called a race condition. In the race condition the USB host races to wake up the USB device before the USB device enters sleep mode after the wait time period lapses.

The USB device enters into sleep mode in response to not receiving a communication reply from the USB host within the wait time period (e.g. 1 msec.) after initiating the remote wakeup procedure on the USB.

A USB host taking more than 1 msec. to wake up may present a problem for USB devices since USB devices may only wait about 1 msec. to receive and detect a communication response back from the USB host before entering into sleep mode. In such cases the USB device will give up waiting for a communication reply and conclude that the remote wake up process by the USB host failed. In other words by the time the USB host wakes up, the USB device is back to sleep and the USB host does not know why the USB device tried to wake it up.

In some cases a user pressing a key on a USB device employed as a keyboard for example to wake up the USB host will not be able to wake up the ho USB host. This may cause the use to become frustrated with the USB system or think that some part of the USB system is not functioning properly.

In other cases a user may continue to press a key or press one or more keys multiple times for example thereby continuously resetting the wait time period for the USB device beyond the wake up time period for the USB host and preventing the USB device from entering sleep mode and permitting the USB host to wake up. Requiring such continuous or repetitive manual actions by the user of the USB device may be considered onerous or frustrating to the user of the USB device and also may cause the user of the USB device to think that some part of the USB system is not functioning properly.

A USB hardware solution to the wake up problem presently exists that detects received remote wakeup, and keeps the USB active until the USB host wakes up. The USB hardware solution increases hardware circuitry, which increases hardware cost, current drain (i.e., power consumption), size, etc., for the USB host and/or USB device because the hardware circuitry needs to be active even when the USB host is in a low power mode.

Accordingly, there is a need for a USB device remotely waking up a USB host over a USB, without the associated disadvantages of the hardware circuitry.

SUMMARY OF THE INVENTION

According to one aspect of the present invention a universal serial bus (USB) device communicates with a USB host over a USB to remotely wake up the USB host over the USB when the USB host is in a low power (e.g. deep sleep) mode. The USB device performs an activity to wake up the USB host. The USB host performs a remote wake up process in response to detecting the activity by the USB device. The USB host performs a resume process in response to performing the remote wake up process by the USB host. The USB device wakes up in response to the USB host performing the resume process.

According to other aspects of the present invention the present invention employs a USB host a USB device a USB system a method for operating a USB host a method for operating a USB device a method for operating a USB system a computer readable memory a signal protocol and associated means therefore.

These and other aspects of the present invention will be apparent from the accompanying drawings the following detailed description and the following claims.

BRIEF DESCRIPTION OF THE DRAWINGS

Aspects of the present invention are illustrated by way of examples and not limitation in the figures of the accompanying drawings in which like reference numbers designate corresponding elements.

FIG. 4 illustrates communication services between the USB host and the one or more USB devices for the USB system as shown in FIGS. 1 and 2 and the physical bus topology as shown in FIG. 3 according to one aspect of the present invention.

DETAILED DESCRIPTION OF THE EMBODIMENTS

The following description drawings and examples are illustrative of the invention and are not to be construed as limiting the invention. Numerous specific details are described to provide a thorough understanding of the present invention. However, in certain instances well-known or conventional details are not described in order to avoid obscuring the description of the present invention. References to one embodiment or an embodiment in the present disclosure are not necessarily to the same embodiment and such references include one or more embodiments.

Figure 1:
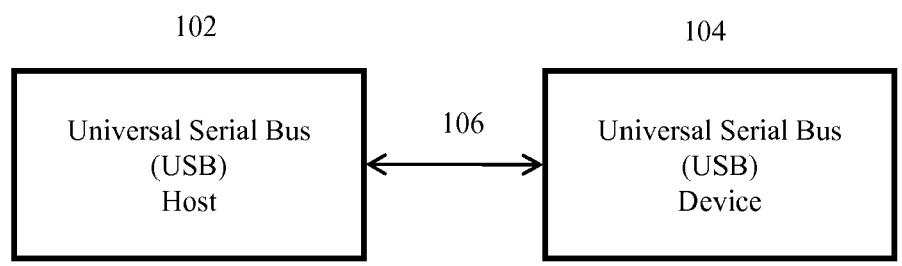
FIG. 1 illustrates a universal serial bus (USB) system providing communication services between a USB host and one or more USB devices over a USB 106 according to one aspect of the present invention.

FIG. 1 illustrates a block diagram representation of a universal serial bus (USB) system 100 providing communication services between a USB host 102 and one or more USB devices 104 over a USB 106 according to one aspect of the present invention.

The system 100 operates according to, is compatible with, and/or compliant with USB Specification Revision 2.0 dated Apr. 27, 2000 ("USB Specification") for example and any continuation analogous similar or complimentary specification thereof. Alternatively the system 100 may operate according to any other specification standard or communication protocol that operates in accordance with aspects of the present invention.

The host 102 may be any type of electronic device adapted to function control and interface with the USB 106. Examples of electronic devices that may embody the host 102 include without limitation a personal computer (PC) a desktop computer, a laptop computer, a workstation a minicomputer a mainframe a supercomputer, a network-based device a data processor a personal digital assistant (PDA) personal organizer a smart card, a modem, a cellular telephone a camera, music and/or video player and or recorder, a pager, and a wristwatch or any combination thereof. The electronic device may be fixed (i.e. stationary) and/or mobile (i.e. portable). In one example the host 102 embodies a mobile side modem (MSM) which may be incorporated into a mobile station otherwise known as a cellular telephone.

A mobile station includes a transmitter and a receiver. The transmitter (not shown) transmits communication signals to a remote base station receiver (not shown) as is well known in the art of communications. The receiver (not shown) receives communication signals from a remote base station transmitter (not shown) as is well known in the art of RF communications.

Other elements of the mobile station which are not shown, include for example a GPS antenna a Galileo antenna a cellular antenna a processor, a user interface a portable power supply and a memory device.

The cellular antenna and a cellular transceiver (e.g. transmitter and receiver) includes circuitry for performing functions required for processing communication signals received and transmitted over a communication link. The communication link is typically a radio frequency communication link to another component such as one or more base stations having communication antenna (not shown).

The cellular transceiver contains a transmit/receive switch (not shown) which routes communication signals (e.g. radio frequency signals) to and from the communication antenna and the cellular transceiver. In some mobile stations a band splitting filter, or "duplexer" is used instead of the T/R switch. Received communication signals are input to a communication receiver in the cellular transceiver and passed to a processor for processing. Communication signals to be transmitted from processor are propagated to a modulator and frequency converter (not shown), each in the transceiver. A power amplifier (not shown) in the cellular transceiver increases the gain of the signal to an appropriate level for transmission to one or more base stations (not shown).

In one embodiment of the mobile station, data generated by acquisition and tracking circuitry in a GPS receiver (not shown) and/or Galileo receiver (not shown) is transmitted over a communication link (e.g. a cellular channel) to one or more base stations. A location server (not shown) then determines the location of mobile station 31 based on the data from one or more satellite receivers (not shown), the time at which the data were measured, and ephemeris data received from the base station's own satellite receiver or other sources of such data. The position location data can then be transmitted back to mobile station or to other remote locations. More details about portable receivers utilizing a communication link are disclosed in commonly assigned U.S. Pat. No. 5,874,914.

The mobile station may contain a user interface (not shown), which may further provide a data input device and a data output device (each not shown).

The data input device typically provides data to a processor in response to receiving input data either manually from a user or automatically from another electronic device. For manual input, the data input device is a keyboard and a mouse, but also may be a touch screen, or a microphone and a voice recognition application, for example.

The data output device typically provides data from a processor for use by a user or another electronic device. For output to a user, the data output device is a display that generates one or more display images in response to receiving the display signals from the processor, but also may be a speaker or a printer, for example. Examples of display images include, for example, text, graphics, video, photos, images, graphs, charts, forms, etc.

The mobile station may also contain a memory device (not shown) representing any type of data storage device, such as computer memory devices or other tangible or computer-readable storage medium for example. The memory device represents one or more memory devices located at one or more locations and implemented as one or more technologies depending on the particular implementation of the mobile station. In addition the memory device may be any device readable by a processor and capable of storing data and/or a series of instructions embodying a process. Examples of the memory device include but are not limited to, RAM, ROM, EPROM, EEPROM, PROM, disk (hard or floppy) CD-ROM, DVD, flash memory etc.

The mobile station may contain a processor (not shown) controlling the operation of the mobile station. The other mobile functions in the processor represent any or all other functions of the mobile station that have not already been described herein. Such other mobile functions include for example operating the mobile station to permit the mobile station to make telephone calls and communicate data.

The mobile station may contain a portable power supply (not shown) which stores and provides portable electrical energy for the electrical elements of the mobile station. Examples of the portable power supply include but are not limited to, batteries and fuel cells. The portable power supply may be or may not be rechargeable. The portable power supply typically has a limited amount of stored electrical energy and needs to be replaced or renewed after some amount of use so that the mobile station can continue to operate.

A communication system (not shown) provides wireless communications for the mobile station and includes but is not limited to cellular, fixed wireless PCS, or satellite communications systems. The communication system (not shown) may provide for multiple access communications in accordance with any standard or protocol such as, for example CDMA, TDMA, FDMA, or GSM, or combinations thereof.

The device 104 is piece of hardware coupled to an end of a USB cable that performs some useful end user function. Examples of the device 104 include without limitation a pen, a mouse a trackball a speaker, a display a monitor a microphone a phone a tablet a joystick, a printer a scanner a camera, external memory device such as a thumb drive, and expansion card, such as a computer's EISA, ISA, or PCI bus, and any combination or variation thereof. In some situations the device 104 may be described as a secondary or peripheral device.

The USB 106 may be wired or wireless. A wired embodiment may employ signals communicated over metal conductors such as copper wires or optical conductors such as fiber optics. A wireless embodiment may employ signals communicated over channels at any frequency such as radio frequency (RF) or infrared (IR) frequency.

Figure 2:
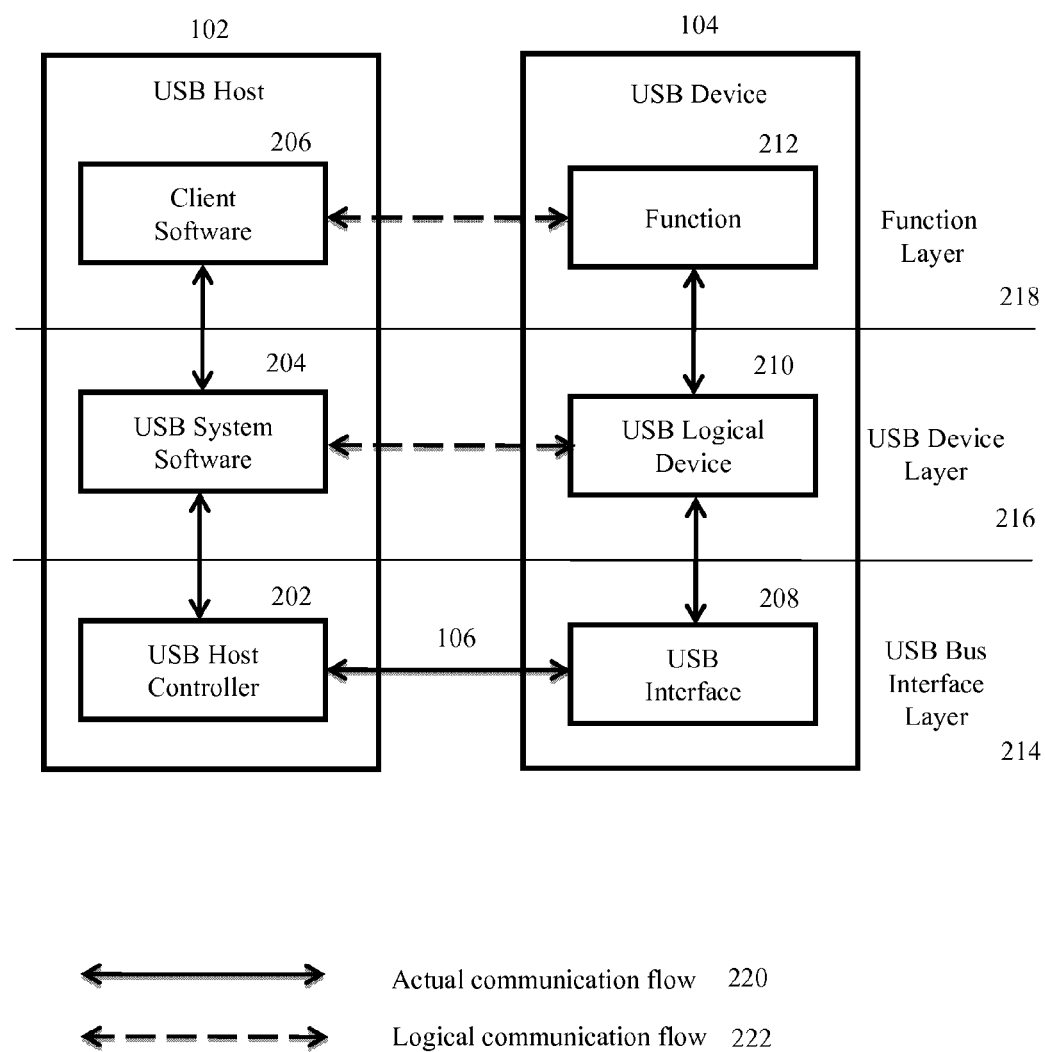
FIG. 2 illustrates details of the USB system as shown in FIG. 1 according to one aspect of the present invention.

FIG. 2 illustrates details of the system 100 as shown in FIG. 1, according to one aspect of the present invention. The host 102 further includes a USB host controller 202 USB system software 204, and client software 206. The device 104 further includes a USB bus interface 208, a USB logical device 210, and a function 212 (also referred to as a functional device).

A solid line connecting the blocks represents actual communication flow 220. Actual communication flow 220 occurs between the host controller 202 in the host 102 and the bus interface 208 in the device 104, between the host controller 202 and the system software 204 in the host 102, between the system software 204 and the client software 206 in the host 102, between the bus interface 208 and the logical device 210 in the device 104, and between the logical device 210 and the function 212 in the device.

Dashed lines connecting the blocks represents logical communication flow 222. Logical communication flow 222 occurs between the system software 204 in the host 102 and the logical device 210 in the device 104, and between the client software 206 in the host 102 and the function 212 in the device 104.

Layers of the system 100 include a USB bus interface layer 214, a USB device layer 216, and a function layer 218. The bus interface layer 214 includes the host controller 202 in the host 102 and the bus interface 208 in the device 104. The bus interface layer 214 provides physical signaling/packet connectivity between the host 102 and the device 104.

The device layer 216 includes the system software 204 in the host 102 and the logical device 210 in the device 104. The device layer 216 is the view the system software 204 has for performing generic USB operations with the device 104.

The function layer 218 includes the client software 206 in the host 102 and the function 212 in the device 104. The function layer 218 provides additional capabilities to the host 102 via corresponding client software 206. The device layer 216 and function layer 218 each have a view of the logical communication flow 222 within the respective layers that use the bus interface layer 214 to accomplish data transfer of the actual communication flow 220 over the USB 106.

The host 102 and the device 104 share rights and responsibilities to support robust reliable communications between the function 212 in the device 104 and the client software 206 in the host 102. USB communications employs bus topology communication flow models bus access management and considerations for isochronous transfers.

The host 102 interacts with devices 104 through the host controller 202. Among other things the host 102 is responsible for detecting the attachment and removal of the device 104 managing control flow between the host 102 and the device 104 managing data flow between the host 102 and the device 104 collecting status and activity statistics and providing power to the coupled device 104.

The host 102 occupies a unique position as the coordinating entity for the USB. In addition to its unique physical location, the host 102 has specific responsibilities with regard to the USB and its coupled devices 104. The host 102 controls all access to the USB. A device 104 gains access to the USB only by being granted access by the host. The host 102 is also responsible for monitoring the topology of the USB.

The host controller 202 in the host 102 provides hardware and software that allows USB devices to be coupled to the host 102.

The system software 204 in the host 102 provides software that supports the USB in a particular operating system and is typically supplied with the operating system independently of particular devices 104 or client software 206. The system software 204 includes for example a USB driver a host controller driver and host software. The system software 204 manages interactions between the device 104 and the host 102. Five areas of interactions between the system software 204 and the device 104 include for example device enumeration and configuration isochronous data transfers asynchronous data transfers power management and device and bus management information.

The client software in the host 102 provides software that executes on the host 206 corresponding to a device 104. The client software 206 is typically supplied with the operating system or provided with the device 104.

The device 104 provides additional functionality to the host 102. The types of functionality provided by the device 104 vary widely. However, all devices 104 present the same basic interface to the host 102 to permit the host 102 to manage the USB related aspects of different USB devices 104 in the same manner. To assist the host 102 in identifying and configuring the devices 104 each device 104 carries and reports configuration related information. Some of the information reported is common among all devices 104. Other information is specific to the functionality provided by the device 104. The detailed format of this information varies depending on the device class of the device 104.

Figure 3:
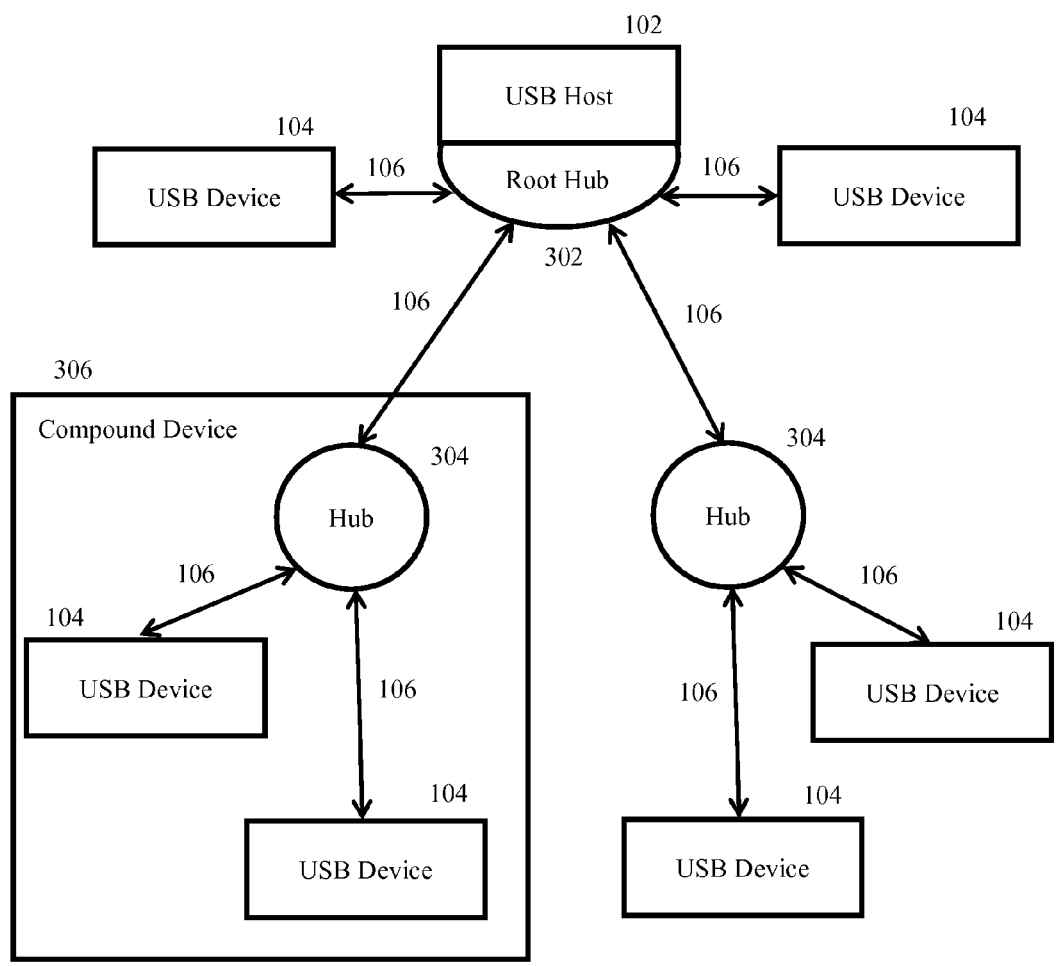
FIG. 3 illustrates a physical bus topology for the USB system as shown in FIGS. 1 and 2 according to one aspect of the present invention.

FIG. 3 illustrates a USB physical bus topology 300 for the system 100 as shown in FIGS. 1 and 2 according to one aspect of the present invention. The bus topology 300 includes the host 102 the devices 104 the USB 106 as well as a root hub 302 and other hubs 304. Another hub 304 and one or more devices 104 may be incorporated into a single compound device 306 for the sake of convenience cost packaging efficiency, etc.

Four aspects of the bus topology 300 include: the host 102 and the devices 104 the physical topology the logical topology and relationships between client software 206 and the device function 212. The host 102 and the devices 104 represent the primary components of the system 100. The physical topology represents how USB elements are coupled together. The logical topology represents the roles and responsibilities of the various USB elements and how the USB appears from the perspective of the host 102 and the device 104. The relationships between client software 206 and the device function 212 represent how client software 206 and its related function 212 interfaces on the device 104 view each other.

Devices 104 on the USB 106 are physically connected to the host 102 via a tiered star topology as illustrated in FIG. 3. USB connection points are provided by a special class of USB device known as a hub. The additional connection points provided by a hub are called ports. A host 102 includes an embedded hub called the root hub 302. The host 102 provides one or more attachment points via the root hub 302. Devices 104 that provide additional functionality to the host 104 are known as functions. To prevent circular connections a tiered ordering is imposed on the star topology of the USB. This results in the tree-like configuration illustrated in FIG. 3.

Multiple functions may be packaged together in what appears to be a single physical device. For example a keyboard and a trackball might be combined in a single package. Inside the package the individual functions are permanently attached to a hub 304 and it is the internal hub that is connected to the USB 106. When multiple functions are combined with a hub 304 in a single package they are referred to as a compound device 306. The hub 304 and each function attached to the hub 304 within the compound device 306 are assigned its own device address. A device 104 that has multiple interfaces controlled independently of each other is referred to as a composite device. A composite device has only a single device address. From the host's perspective a compound device is the same as a separate hub with multiple functions attached.

FIG. 4 illustrates communication services between the USB host 102 and the one or more USB devices 104 for the USB system 100 as shown in FIGS. 1 and 2 and the physical bus topology 300 as shown in FIG. 3 according to one aspect of the present invention. The communication services may be considered a method or a process that operate or are performed over time 420. Thus, the diagram in FIG. 4 may also be represented by or employ one or more process flowcharts. The host 102 performs the communication services that are positioned there under along the dotted line 422. The device 104 performs the communication services that are positioned there under along the dotted line 424. Communication services shared by each of the host 102 and the device 104 bridge both dotted lines 422 and 424.

The host 102 may have a power management system that is independent of the USB. The system software 204 interacts with the host's power management system to handle system power events such as suspend or resume. Additionally devices 104 typically implement additional power management features that allow them to be power managed by system software. The power distribution and power management features of the USB allow it to be designed into power sensitive systems such as battery-based notebook computers and mobile side modems (MSM), described herein.

The USB employs a polled bus protocol. The host controller 202 initiates all data transfers. Most bus transactions involve the transmission of up to three packets. Each transaction begins when the host controller 202, on a scheduled basis, sends a USB packet describing the type and direction of transaction, the USB device address, and endpoint number. This packet is referred to as a "token packet." The device 104 that is addressed selects itself by decoding the appropriate address fields. In a given transaction data is transferred either from the host 102 to the device 104 or from the device 104 to the host 102. The direction of data transfer is specified in the token packet. The source of the transaction then sends a data packet or indicates it has no data to transfer. The destination, in general, responds with a handshake packet indicating whether the transfer was successful. Some bus transactions between host controllers 202 and hubs 304 involve the transmission of four packets. These types of transactions are used to manage the data transfers between the host 102 and full-/low-speed devices 104.

The USB data transfer model between a source or destination on the host 102 and an endpoint on a device 104 is referred to as a pipe. There are two types of pipes: stream and message. Stream data has no USB-defined structure, while message data does have a USB-defined structure. Additionally, pipes have associations of data bandwidth, transfer service type, and endpoint characteristics like directionality and buffer sizes. Most pipes come into existence when a USB device is configured. One message pipe, the Default Control Pipe, always exists once a device is powered, in order to provide access to the device's configuration status and control information. The transaction schedule allows flow control for some stream pipes. At the hardware level, this prevents buffers from under run or over run situations by using a NAK (i.e, negative acknowledgement) handshake to throttle the data rate. When NAK'ed, a transaction is retried when bus time is available. The flow control mechanism permits the construction of flexible schedules that accommodate concurrent servicing of a heterogeneous mix of stream pipes. Thus, multiple stream pipes can be serviced at different intervals and with packets of different sizes.

During process 402 the host 102 and the device 104 operate in a normal state of communications using processes well known in the art of USB communications.

During time period 403 there is an idle time period when there is no communications between the host 102 and the device 104. For example when the device 104 is a keyboard an idle time period may occur when the user does not press a key.

During process 404 the host 102 suspends the USB and enters a low power mode in response to the idle time period having or exceeding a determined duration. The low power mode may otherwise be known as a deep sleep mode which permits that the host 102 operating on a portable power source such as a battery to conserve power. In the deep sleep mode most of the electronic circuitry in the host 102 is turned off to minimize current drain.

During process 405 the host 102 and the device 104 operate in a suspended state of communications using processes well known in the art of USB communications. The host 102 and the device 104 may be in the suspended state for any time duration. The suspended state permits the host 102 and/or the device 104 to conserve battery power for later normal operation.

According to Section 10.5.4.2 of the USB Specification two cooperating levels of power management for the USB include bus and device level management. Device classes may define class-specific power control capabilities. USB devices 104 support the suspended mode. The device 104 is placed into the suspended state via control of the hub port to which the device 104 is attached. Normal device operation ceases in the suspended mode. If the device 104 is capable of wakeup signaling and the device 104 is enabled for remote wakeup it may generate resume signaling in response to external events. The power management system may transition a device to the suspended state or power-off the device 104 in order to control and conserve power. The USB Specification provides neither requirements nor commands for the device state to be saved and restored across these transitions. Device classes may define class-specific device state save-and-restore capabilities. The system 100 coordinates the interaction between device power states and the suspended mode. It is recommended that while a device 104 is not being used by the system 100 (i.e. no transactions are being transmitted to or from the device besides SOF tokens) the device 104 be suspended as soon as possible by selectively suspending the port to which the device is attached. Suspending inactive devices reduces reliability issues due to high currents passing through a transceiver operating in high-speed mode in the presence of short circuit conditions. Some of these short circuit conditions are not detectable in the absence of transactions to the device 104. Suspending the unused device 104 will place the transceiver interface into full-speed mode which has a greater reliability in the presence of short circuit conditions.

During process 406 the device 104 performs an activity. For example when the device 104 is a keyboard the activity may be generating a data packet representing a keystroke in response to the user pressing a key, and sending (i.e. transmits provides) the generated data packet to the host 102. The activity may be manually generated by a user, such as by pressing a key, or may be automatically generated by the device 104. The activity performed at process 406 is intended to wake up the host 102 and wake up the device 104. Upon performing the activity at process 406 the user of the device 104 and/or the host 102 expects that the host 102 to exit the low power mode and resume a normal state of operation with the device 104.

During process 407 the device 104 may store the activity (e.g. data packet representing a keystroke) in memory in the device 104 for future reference and retrieval at process 415 for example in response to performing the activity at process 406. This process 407 is optional and not required when the activity performed is not important enough to be captured (e.g. data packet representing a keystroke since the user can press the key again with minor inconvenience).

During time period 408 the device 104 waits for a time period for a communication from the host 102 in response to performing the activity at process 406. Typically devices 104 wait for a time period of about one millisecond (i.e. 1 msec.) while expecting a communication from the host 102.

During process 409 the host 409 detects the activity performed by the device 104 at process 406 in response to the device 104 performing the activity at process 406 using processes well known in the art of USB communications.

During process 410 the host 102 performs a remote wakeup process in response to detecting the activity at process 409 using processes well known in the art of USB communications.

According to Section 9.2.5.2 of the USB Specification, remote wakeup allows a suspended device 104 to signal a host 102 that may also be suspended. This notifies the host 102 that it should resume from its suspended mode if necessary and service the external event that triggered the suspended device 104 to signal the host 102. A device 104 reports its ability to support remote wakeup in a configuration descriptor. If a device 104 supports remote wakeup it must also allow the capability to be enabled and disabled using the standard USB requests. Remote wakeup is accomplished using electrical signaling described in Section 7.1.7.7 of the USB Specification.

According to Section 10.5.4.5 of the USB Specification, the system 100 can minimize the resume power consumption of a suspended USB tree. This is accomplished by explicitly enabling devices capable of resume signaling and controlling propagation of the resume signaling, via selectively suspending and/or disabling hub ports between the device 104 and the nearest self-powered awake hub. In some error-recovery scenarios the USB System will need to re-enumerate sub-trees. The sub-tree may be partially or completely suspended. During error-recovery the USB System must avoid contention between a device 104 issuing resume signaling and simultaneously driving reset down the port. Avoidance is accomplished via management of the devices' remote wakeup feature and the hubs' port features.

During time period 411 the host 102 takes a time period to wake up before providing a communication to the device 104 in response to performing the remote wake up process at process 410. The wake up time period for the host 102 may be greater than one millisecond (i.e. 1 msec.) and for mobile side modems (MSMs) for example may be in the range of seven (7) milliseconds (i.e. 7 msec.). The case when the device 104 has a shorter wait time at time 408 than the wake up time at time 411 of the host 102 may otherwise be called a race condition. In the race condition the host 102 iraces to wake up the device 104 before the device 104 enters sleep mode at process 412 after the wait time period lapses at time 408.

During process 412 the device 104 enters into sleep mode in response to not receiving a communication reply from the host 102 within the wait time period (e.g. 1 msec.) after performing the activity at process 406.

During process 413 the host 102 performs a resume process in response to performing the remote wake up process at process 410. In the example of the mobile side modems (MSMs) the resume process may be performed after about 7 msec. has lapsed. The resume process 413 solves the problem of having the host 102 wake up after the device 104 has already gone back to sleep at process 412. The resume process 413 ensures that the device 104 will wake up after the device 104 had already gone back to sleep at process 412. In other words the host 102 performs the resume process 413 to resume the operation of the device 104. By performing the resume process 413 the host 102 resumes the operation of the device 104 that tried to issue a remote wakeup sequence by performing the activity at process 406 but failed because the host 102 did not wake up in time. After the device 104 detects that resume process 413 the device 104 wakes up and permits the device 104 to perform activities under a normal state of operation.

When host 102 performs the resume process 413 the host 102 resumes the operation of (i.e. wakes up) all connected devices 104. Some of the devices 104 will not need to communicate with the host 102 and would return to sleep after the idle time 403 while the devices 104 that previously woke up the host 102 are permitted to communicate.

An advantage of a solution of the host 102 performing the resume process after performing the remote wake up process is that the solution can be implemented in software (i.e. programming instructions or code) and does not require a hardware change. A software change without a hardware change is a significant advantage for implementing a solution in hardware devices that are already manufactured and/or deployed to customers. Further, a solution implemented in software reduces hardware cost space and power consumption in new hardware designs.

According to Section 7.1.7.7 of the USB Specification if a device 104 is in the suspend mode its operation is resumed when any non-idle signaling is received on its upstream facing port. Additionally the device 104 can signal the system 100 to resume operation if its remote wakeup capability has been enabled by the system software 204. Resume signaling is used by the host 102 or a device 104 to bring a suspended bus segment back to the active condition.

Hubs play an important role in the propagation and generation of resume signaling. The following description is an outline of a general global resume sequence. A complete description of the resume sequence, the special cases caused by selective suspend, and the role of the hub are given in Section 11.9 of the USB Specification.

The host 102 may signal resume (TDRSMDN) at any time. The host 102 sends the resume signaling for at least 20 ms, and ends the resume signaling in one of two ways, depending on the speed at which its port was operating when it was suspended. If the port was in low-/full-speed when suspended, the resume signaling must be ended with a standard, low-speed EOP (two low-speed bit times of SE0 followed by a J). If the port was operating in high speed when it was suspended, the resume signaling must be ended with a transition to the high-speed idle state. The 20 ms of resume signaling ensures that all devices 104 in the network that are enabled to see the resume are awakened. The connectivity established by the resume signaling is torn down by the End of Resume, which prepares the hubs for normal operation. After resuming the bus, the host 102 must begin sending bus traffic (at least the SOF token) within 3 ms of the start of the idle state to keep the system from going back into the suspend mode.

A device 104 with remote wakeup capability may not generate resume signaling, unless the bus has been continuously in the idle state for 5 msec. (TWTRSM). This allows the hubs to get into their suspend state and prepare for propagating resume signaling. The remote wakeup device must hold the resume signaling for at least 1 msec. but for no more than 15 msec. (TDRSMUP). At the end of this period, the device 104 stops driving the bus (puts its drivers into the high-impedance state and does not drive the bus to the J state).

If the hub upstream of a remote wakeup device is suspended, it will propagate the resume signaling to its upstream facing port and to all of its enabled downstream facing ports, including the port that originally signaled the resume. When a hub is propagating resume signaling from a downstream device it may transition from the idle state to K with a rise time faster than is normally allowed. The hub must begin this rebroadcast (TURSM) of the resume signaling within 1 ms of receiving the original resume. The resume signal will propagate in this manner upstream until it reaches the host or a non-suspended hub (refer to Section 11.99), which will reflect the resume downstream and take control of resume timing. This hub is termed the controlling hub. Intermediate hubs (hubs between the resume initiator and the controlling hub) drive resume (TDRSMUP) on their upstream facing port for at least 1 ms during which time they also continue to drive resume on enabled downstream facing ports. An intermediate hub will stop driving resume on the upstream facing port and reverse the direction of connectivity from upstream to downstream within 15 ms after first asserting resume on its upstream facing port. When all intermediate hubs have reversed connectivity, resume is being driven from the controlling hub through all intermediate hubs and to all enabled ports. The controlling hub must rebroadcast the resume signaling within 1 msec. (TURSM) and ensures that resume is signaled for at least 20 msec. (TDRSMDN). The hub may then begin normal operation by terminating the resume process as described above.

The system software 204 must provide a 10 msec. resume recovery time (TRSMRCY) during which it will not attempt to access any device connected to the affected (just-activated) bus segment.

Port connects and disconnects can also cause a hub to send a resume signal and awaken the system. These events will cause a hub to send a resume signal only if the hub has been enabled as a remote-wakeup source.

If the hub port and device were operating in high-speed prior to suspend they are required to "remember" that they were previously operating in high-speed, and they must transition back to high-speed operation, without arbitration, within two low-speed bit times of the K to SE0 transition. The inactivity timers must be started two low-speed bit times after the K to SE0 transition. Note that the transition from SE0 to J which would normally occur at the end of full-speed resume signaling is omitted if the link was operating in high-speed at the time when it was suspended. The host 102 begins sending SOF's in time to prevent the high-speed tree from suspending.

During process 414 the device 104 wakes up from sleep mode (entered at process 412) in response to receiving a communication reply from the host 102 after the host 102 performed the resume process 413.

During process 415 the device 104 retrieves the activity (e.g. data packet representing a keystroke) stored at process step 407 in response to waking up at process 414.

During process 416 the device 104 sends the retrieved stored activity to the host 102 in response to retrieving the stored activity at process 415. Process steps 415 and 416 are optional processes are not required for the host 102 to perform the resume process 413 to wake up the device 104. Processes 415 and 416 advantageously permit the device 104 to remember and apply the activity performed by the device 104 before the device 104 entered into the sleep mode without requiring the device 104 to perform the activity again if desired.

During process 417 device 104 continues to perform the same or other activities (e.g. generating and sending data packets representing key presses to the host 102).

During process 418 the host 102 and the device 104 operate in a normal state of communications using processes well known in the art of USB communications as in process 402.

The system elements method and/or processes contained herein may be implemented in hardware software or a combination of both, and may include one or more processors. A processor is a device and/or set of machine-readable instructions for performing task. A processor may be any device capable of executing a series of instructions embodying a process including but not limited to a computer a microprocessor a controller, an application specific integrated circuit (ASIC) finite state machine digital signal processor (DSP) or some other mechanism. The processor includes any combination of hardware firmware and/or software. The processor acts upon stored and/or received information by computing, manipulating analyzing, modifying converting or transmitting information for use by an executable application or procedure or an information device and/or by routing the information to an output device.

An executable application comprises machine code or machine readable instruction for implementing predetermined functions including, for example, those of an operating system, a software application program, or other information processing system, for example, in response user command or input.

An executable procedure is a segment of code (i.e, machine readable instruction), sub-routine, or other distinct section of code or portion of an executable application for performing one or more particular processes and may include performing operations on received input parameters (or in response to received input parameters) and providing resulting output parameters.

In various embodiments, hardwired circuitry may be used in combination with software instructions to implement the present invention. Thus, the techniques are not limited to any specific combination of hardware circuitry and software, or to any particular source for the instructions executed by the data processing system. In addition, throughout this description various functions and operations are described as being performed by or caused by software code to simplify description. However, those skilled in the art will recognize what is meant by such expressions is that the functions result from execution of the code by a processor.

It will be apparent from this description that aspects of the present invention may be embodied, at least in part, in software. That is, the techniques may be carried out in a computer system or other data processing system in response to its processor executing sequences of instructions contained in a machine-readable medium.

A machine-readable medium includes any mechanism that provides (i.e., stores and/or transmits) information in a form accessible by a machine (e.g., a computer, network device, personal digital assistant, computer, data processor, manufacturing tool, any device with a set of one or more processors, etc.). A machine-readable medium can be used to store software and data which, when executed by a data processing system, causes the system to perform various methods of the present invention. Portions of this executable software and/or data may be stored in various places.

For example a machine-readable medium includes recordable/non-recordable media (e.g. read only memory (ROM) random access memory (RAM) magnetic disk storage media, optical storage media, flash memory devices non-volatile memory cache remote storage device etc.) as well as electrical optical acoustical or other forms of propagated signals (e.g. carrier waves infrared signals digital signals etc.) etc.

In the foregoing specification the invention has been described with reference to specific exemplary embodiments thereof. It will be evident that various modifications may be made thereto without departing from the broader spirit and scope of the invention as set forth in the following claims. The specification and drawings are, accordingly to be regarded in an illustrative sense rather than a restrictive sense.

What is claimed is:

1. A universal serial bus (USB) host comprising:
a processor unit comprising tangible electronic circuitry; and
a memory unit coupled to the processor unit and having stored thereon processor executable instructions configured to cause the processor unit to perform operations comprising:
communicating with a USB device over a USB;
detecting activity by the USB device requesting a service to be performed by the USB host;
performing a remote wake up process in response to detecting activity by the USB device, the remote wake up process changing an activity mode of the USB host; and
performing a resume process in response to performing the remote wake up process, the resume process initiating a wake up process on the USB device enabling the USB device to perform the requested activity with the requested service by the USB host.

2. A USB host according to claim 1, wherein the memory unit has stored thereon processor executable instructions configured to cause the processor unit to perform operations further comprising:
placing the USB host and the USB device in a suspended state of operation; and
placing place the USB host in a low power mode in response to an idle time period of no communications between the USB host and the USB device.

3. A USB host according to claim 1, wherein the memory unit has stored thereon processor executable instructions configured to cause the processor unit to perform operations further comprising:
entering a normal state of operation in response to the resume process.

4. A USB host according to claim 1, wherein the memory unit has stored thereon processor executable instructions configured to cause the processor unit to perform operations further comprising:
performing the resume process in response to the remote wake up process exceeding a wait time period for the USB device to receive a communication from the USB host.

5. A USB host according to claim 1, further comprising:
a mobile station modem.

6. A USB host according to claim 5, wherein the mobile station modem comprises:
a radio frequency interface.

7. A USB host according to claim 6, wherein the mobile station modem comprises:
an integrated circuit.

8. A USB host according to claim 1, further comprising:
a portable power supply configured to provide power to the USB host.

9. A universal serial bus (USB) device configured with executable software, comprising:
a USB interface configured to cause the USB device to communicate with a USB host over a USB; and
a USB logical device configured to communicate with the USB interface and-to cause the USB device to perform operations comprising:
performing an activity to wake up the USB device, the activity requesting that a service be performed by the USB host and initiating a remote wake up process for the USB host;
storing the activity in memory;
waking up the USB device in response to the USB host performing the remote wake up process and a resume process;
retrieving the activity stored in memory in response to the USB device waking up; and
sending the retrieved activity stored in memory to the USB host.

10. A USB device according to claim 9, wherein the USB logical device is further configured to cause the USB device to:
place the USB host and the USB device in a suspended state of operation in response to an idle time period of no communications between the USB host and the USB device.

11. A USB device according to claim 9, wherein the USB logical device is further configured to cause the USB device to:
enter a normal state of operation in response to the resume process.

12. A USB device according to claim 9, wherein the USB logical device is further configured to cause the USB device to:
place the USB host in a low power mode in response to the remote wake up process exceeding a wait time period for the USB device to receive a communication from the USB host.

13. A USB device according to claim 9, wherein the USB logical device is further configured to cause the USB device to:
perform activities in response to the USB device waking up.

14. A USB device according to claim 9, wherein the USB device is configured to receive power from the USB host over the USB to power the USB device.

15. A universal serial bus (USB) system, comprising:
a USB device comprising a USB logical device; and
a USB host configured with executable software comprising a USB host controller configured to cause the USB host to communicate with the USB device over a USB, and USB system software configured to communicate with the USB host controller and to cause the USB host to perform operations comprising:
detecting activity by the USB device requesting that a service be performed by the USB host;
performing a remote wake up process in response to detecting the activity by the USB device, the remote wake up process changing an activity mode of the USB host; and
performing a resume process in response to performing the remote wake up process, the resume process initiating a wake up process on the USB device enabling the USB device to perform the requested the activity with the requested service by the USB host,
wherein the USB logical device is configured with executable software to cause the USB device to perform operations comprising:
performing the activity to wake up the USB device, the activity initiating the remote wake up process for the USB host;
storing the activity in memory;
waking up the USB device in response to the USB host performing the resume process;
retrieving the activity stored in memory in response to waking up the USB device; and
sending the retrieved activity stored in memory to the USB host.

16. A method for operating a universal serial bus (USB) host, comprising:
detecting activity by a USB device coupled to the USB host, the activity requesting that a service be performed by the USB host;
performing a remote wake up process in response to detecting activity by the USB device the remote wake up process changing an activity mode of the USB host; and
performing a resume process in response to performing the remote wake up process, the resume process initiating a wake up process on the USB device enabling the USB device to perform the requested the activity with the requested service by the host.

17. A method for operating a universal serial bus (USB) device, comprising:
performing an activity to wake up the USB device, the activity requesting a service be performed by a USB host coupled to the USB device and initiating a remote wake up process for the USB host, the remote wake up process changing an activity mode of the USB host;
storing the activity in memory;
waking up the USB device in response to the USB host performing the remote wake up process and a resume process;
retrieving the activity stored in memory in response to waking up the USB device; and
sending the retrieved activity stored in memory to the USB host.

18. A non-transitory processor-readable medium having stored thereon processor-executable software instructions configured to cause a tangible electronic device processor comprising electronic circuitry to perform operations comprising:
establishing a communication channel between a universal serial bus (USB) host and a USB device;
performing an activity by the USB device, the activity requesting that a service be performed by the USB host;
performing a remote wake up process by the USB host in response to detecting the activity by the USB device, the remote wake up process changing an activity mode of the USB host;
performing a resume process by the USB host in response to performing the remote wake up process by the USB host, the resume process initiating a wake up process on the USB device enabling the USB device to perform the requested the activity with the requested service by the USB host; and
waking up the USB device in response to the USB host performing the resume process.

19. A non-transitory processor-readable medium having stored thereon processor-executable software instructions configured to cause a universal serial bus (USB) host to perform operations comprising:
detecting activity of a USB device coupled to the USB host requesting that a service be performed by the USB host;
performing a remote wake up process in response to detecting activity by the USB device, the remote wake up process changing an activity mode of the USB host; and
performing a resume process in response to performing the remote wake up process, the resume process initiating a wake up process on the USB device enabling the USB device to perform the requested the activity with the requested service by the USB host.

20. A non-transitory processor-readable medium having stored thereon processor-executable software instructions configured to cause a universal serial bus (USB) device to perform operations comprising:
performing an activity to wake up the USB device, the activity requesting a service be performed by a USB host coupled to the USB device and initiating a remote wake up process for the USB host, the remote wake up process changing an activity mode of the USB host;
storing the activity in memory;
waking up the USB device in response to the USB host performing the remote wake up process and a resume process, the resume process performing the service requested by the USB device;
retrieving the activity stored in memory in response to waking up the USB device; and
sending the retrieved activity stored in memory to the USB host.

21. A USB host comprising:
means for detecting activity by a USB device coupled to the USB host, the activity requesting that a service be performed by the USB host;

means for performing a remote wake up process in response to detecting the activity by the USB device, the remote wake up process changing an activity mode of the USB host; and means for performing a resume process initiating a wake up process on the USB device enabling the USB device to perform the requested the activity with the requested service by the USB host.

22. A USB comprising:

means for performing an activity on the USB device requesting a service be performed by a USB host and initiating a remote wake up process on the USB host;

means for storing the activity performed to wake up the USB device;

means for waking up the USB device in response to the USB host performing the remote wake up process and a resume process;

means for retrieving the activity in response to waking up the USB device; and means for sending the retrieved activity to the USB host.

* * * * *